(12) United States Patent
Yun et al.

(10) Patent No.: US 7,218,433 B2
(45) Date of Patent: May 15, 2007

(54) SCANNING APPARATUS USING A PLURALITY OF DIFFRACTED BEAMS

(75) Inventors: Sang Kyeong Yun, Kyunggi-do (KR); In-Jae Yeo, Kyunggi-do (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 277 days.

(21) Appl. No.: 10/952,246

(22) Filed: Sep. 28, 2004

(65) Prior Publication Data

US 2005/0111066 A1 May 26, 2005

(30) Foreign Application Priority Data

Nov. 3, 2003 (KR) .................... 10-2003-0077390

(51) Int. Cl.
*G02B 26/08* (2006.01)
*B41J 2/47* (2006.01)
*B41J 27/00* (2006.01)

(52) U.S. Cl. .............. 359/205; 359/204; 359/206; 359/212; 359/216; 347/239; 347/243

(58) Field of Classification Search .................. None
See application file for complete search history.

(56) References Cited

U.S. PATENT DOCUMENTS

| 4,312,588 A | 1/1982 | Minoura et al. |
| 5,561,544 A | 10/1996 | Macken |
| 5,610,647 A | 3/1997 | Takada |
| 5,890,789 A * | 4/1999 | Inagaki et al. ............ 359/305 |
| 6,384,950 B1 | 5/2002 | Saito et al. |
| 6,556,311 B1 * | 4/2003 | Benear et al. ............ 358/1.9 |
| 2003/0161046 A1 | 8/2003 | Kawamura et al. |

FOREIGN PATENT DOCUMENTS

KR  2001-0090718 A  10/2001

* cited by examiner

*Primary Examiner*—James Phan
(74) *Attorney, Agent, or Firm*—Christensen O'Connor Johnson Kindness PLLC

(57) ABSTRACT

The present invention provides a scanning apparatus, which scans a plurality of diffracted beams, obtained by diffracting and modulating light emitted from a single light source, on a scanning object, such as the drum of a printer or sheet.

17 Claims, 6 Drawing Sheets

SCANNING APPARATUS USING A PLURALITY OF DIFFRACTED BEAMS

BACKGROUND OF THE INVENTION

1. Field of the Invention

The present invention relates, in general, to scanning apparatuses using a plurality of diffracted beams and, more particularly, to a scanning apparatus, which can scan a plurality of diffracted beams formed by diffracting and modulating light generated by a single light source onto a scanning object, such as the drum of a printer and a sheet.

2. Description of the Related Art

Light beam scanning apparatuses are devices for scanning light beams and forming the spots of the light beams on a photosensitive medium to form an image in an image formation device, for example, a laser printer, a display device, a Light Emitting Diode (LED) printer, an electronic photocopier or a word processor.

As image formation devices have been developed toward the requirements of miniaturization, high speed and high resolution, such a light beam scanning apparatus has been gradually researched and developed to obtain the characteristics of miniaturization, high speed and high resolution so as to meet the requirements.

The light beam scanning apparatuses of an image formation device can be classified into a laser scanning scheme using an f·θ lens and an image head printing scheme according to a light beam scanning scheme and the construction thereof.

FIG. 1 is a view showing a conventional laser scanning apparatus using an f·θ lens.

As shown in FIG. 1, the conventional laser scanning apparatus includes a Laser Diode (LD) 100 for emitting a light beam in response to a video signal, a collimator lens 101 for converting the light beam emitted from the LD 100 into collimated light, a cylindrical lens 102 for converting the collimated light output from the collimator lens 101 into linear light parallel to a scanning direction, a polygon mirror 103 for moving and scanning the parallel linear light from the cylindrical lens 102 at a constant linear velocity, a polygon mirror driving motor 104 for rotating the polygon mirror 103 at a uniform velocity, an f·θ lens having a certain refractive index relative to an optical axis to deflect light, reflected from the polygon mirror 103 and moved at a constant angular velocity, in a main scanning direction, correct aberration and focus the light onto a scanning surface, a reflective mirror 106 for image formation for reflecting laser beams output from the f·θ lens 105 in a predetermined direction and forming an image using the reflected laser beams on the surface of a photosensitive drum 107, which is an image formation surface, in the form of spots, a horizontal synchronizing mirror 108 for reflecting the laser beams from the f·θ lens 105 in a horizontal direction, and an optical sensor 109 for receiving laser beams reflected from the horizontal synchronizing mirror 108 and synchronizing the laser beams.

In the conventional laser scanning apparatus having the above construction, the light beam output from the LD 100 is converted into collimated light by the collimator lens 101, focused in the direction of the rotation shaft of the polygon mirror 103 by the cylindrical lens 102, and reflected by the polygon mirror 103 rotating at a constant angular velocity. Light beams, reflected by the polygon mirror 103, pass through the f·θ lens 105, and the passed light beams are formed as spots, each with a certain diameter, on the photosensitive drum 107. In this case, since the resolution of a printer is determined with the diameter of the spots formed on the photosensitive drum 107, the machinability of the f·θ lens must be excellent.

However, a light beam scanning apparatus must be generally considered from the aspect of miniaturization and cost. Therefore, in order to reduce the number of lenses in the f·θ lens, the f·θ lens includes a Y-toric surface, an anamorphic surface, a freeform surface, etc. Therefore, since it is difficult to form the surface of the f·θ lens, the machinability thereof is deteriorated. Consequently, there is a disadvantage in that the performance and resolution of the light beam scanning apparatus are deteriorated.

Further, the above-described conventional scanning apparatus is problematic in that, since printing speed is proportional to the rotation speed of a polygon mirror, and one line is printed with respect to each side of the polygon mirror, the rotation speed of the polygon mirror must be further increased in the case where high speed printing is performed, so that a time for which a laser beam is radiated is reduced, and a laser diode having high power must be used to obtain the same light scanning effect.

If the conventional scanning apparatus having the above problem is used in a printer, there are problems in that, since an expensive high speed polygon mirror must be used, the cost is greatly increased, and printing speed cannot be increased to a certain level or higher.

SUMMARY OF THE INVENTION

Accordingly, the present invention has been made keeping in mind the above problems occurring in the prior art, and an object of the present invention is to provide a scanning apparatus, which can scan a plurality of diffracted beams formed by diffracting and modulating light generated by a single light source onto a scanning object, such as the drum of a printer and a sheet.

Another object of the present invention is to provide a scanning apparatus, which can decrease the rotation speed of a polygon mirror in proportion to the number of beams output from a light modulator, thus utilizing an inexpensive polygon mirror.

A further object of the present invention is to provide a scanning apparatus, which allows the scanning time of a laser diode required for exposure to be long with respect to a single pixel by simultaneously scanning a plurality of beams, thus utilizing a laser diode having relatively low output power.

Still another object of the present invention is to provide a scanning apparatus, which can increase printing speed a minimum of several times to a maximum of several hundred times compared to a conventional scanning scheme because the printing speed of a printer is proportional to the multiplication of the rotation speed of a polygon mirror by the number of beams.

In order to accomplish the above objects, the present invention provides a scanning apparatus using a plurality of diffracted beams, comprising light generation processing means for generating a beam, converting the beam into collimated light, and outputting the collimated light; light modulation processing means for diffracting and modulating the beam, which is the collimated light output from the light generation processing means, and focusing a plurality of diffracted beams; and scanning means for moving and reflecting the plurality of diffracted beams focused by the light modulation processing means at a constant linear velocity or non-constant linear velocity, deflecting the plurality of diffracted beams, reflected and moved at a constant angular velocity or non-constant angular velocity, in a main scanning direction, correcting aberration, and focusing and scanning the plurality of diffracted beams onto a scanning surface of a scanning object.

Further, the present invention provides a printer using a plurality of diffracted beams, comprising light generation processing means for generating a beam, converting the beam into collimated light, and outputting the collimated light; light modulation processing means for diffracting and modulating the beam, which is the collimated light output from the light generation processing means, and focusing a plurality of diffracted beams; and scanning means for moving and reflecting the plurality of diffracted beams focused by the light modulation processing means at a constant linear velocity or non-constant linear velocity, deflecting the plurality of diffracted beams, reflected and moved at a constant angular velocity or non-constant angular velocity, in a main scanning direction, correcting aberration, and focusing and scanning the plurality of diffracted beams onto a scanning surface of a scanning object.

Further, the present invention provides a display device using a plurality of diffracted beams, comprising light generation processing means for generating a beam, converting the beam into collimated light, and outputting the collimated light; light modulation processing means for diffracting and modulating the beam, which is the collimated light output from the light generation processing means, and focusing a plurality of diffracted beams; and scanning means for moving and reflecting the plurality of diffracted beams focused by the light modulation processing means at a constant linear velocity or non-constant linear velocity, deflecting the plurality of diffracted beams, reflected and moved at a constant angular velocity or non-constant angular velocity, in a main scanning direction, correcting aberration, and focusing and scanning the plurality of diffracted beams onto a scanning surface of a scanning object.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
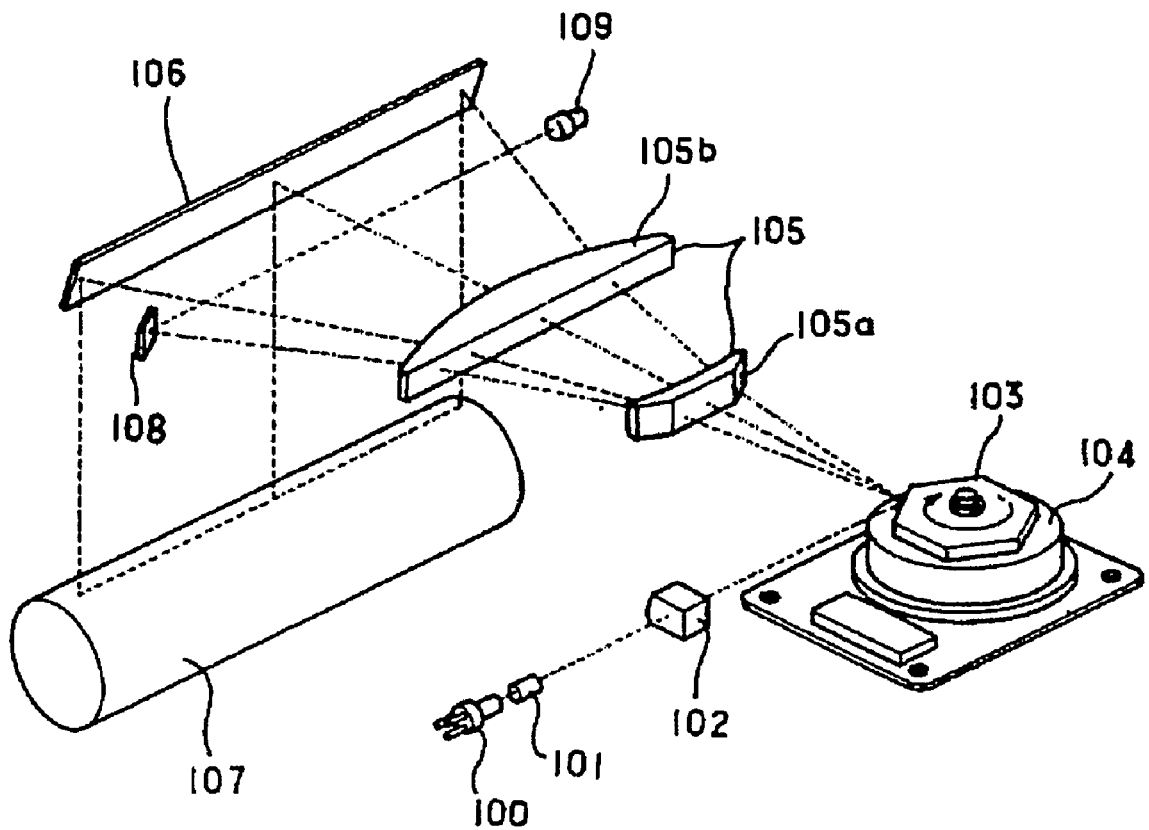
FIG. 1 is a view showing the construction of a conventional scanning apparatus for printers.

Hereinafter, embodiments of the present invention will be described in detail with reference to the attached drawings.

Reference now should be made to the drawings, in which the same reference numerals are used throughout the different drawings to designate the same or similar components.

Figure 2:
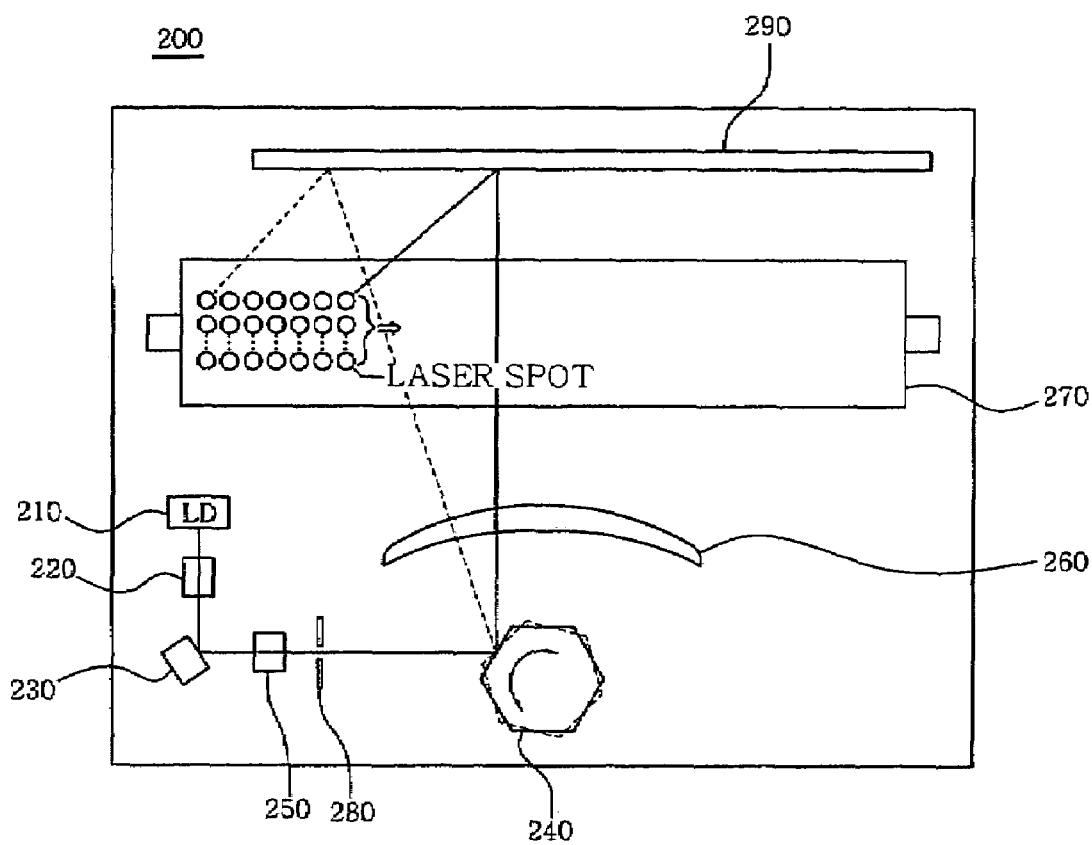
FIG. 2 is a view showing the construction of a scanning apparatus using a plurality of diffracted beams according to an embodiment of the present invention.

FIG. 2 is a view showing the construction of a scanning apparatus using a plurality of diffracted beams according to an embodiment of the present invention.

Figure 3:
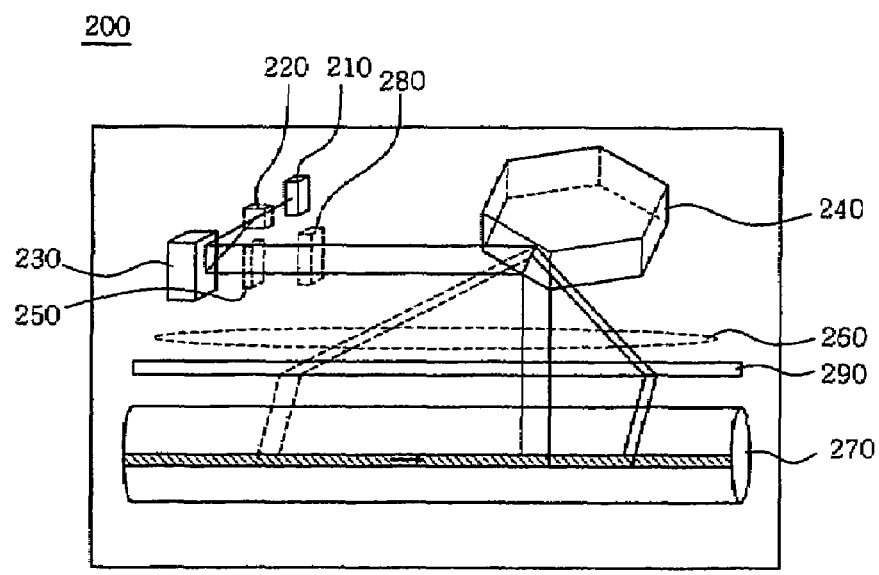
FIG. 3 is a perspective view showing the construction of the scanning apparatus using a plurality of diffracted beams according to an embodiment of the present invention.

FIG. 3 is a perspective view showing the construction of the scanning apparatus using a plurality of diffracted beams according to an embodiment of the present invention.

Referring to FIGS. 2 and 3, the scanning apparatus 200 of the present invention includes a Laser Diode (LD) 210 for generating a laser beam, at least one first lens 220 for converting the laser beam emitted from the LD 210 into collimated light, a light modulator 230 for diffracting and modulating the laser beam, which is converted into collimated light by the first lens 220, to output N (N is a natural number) beams, a rotating mirror 240 for moving and scanning the plurality of diffracted beams output from the light modulator 230 at a non-constant or constant linear velocity, at least one second lens 250 for focusing the plurality of diffracted beams, which are output from the light modulator 230 after being diffracted and modulated thereby, in the direction of the rotation shaft of the rotating mirror 240, a third lens 260 for deflecting the plurality of diffracted beams, reflected from the rotating mirror 240 and moved at a non-constant or constant angular velocity, in a main scanning direction and correcting the aberration, and a rotatable reflective mirror 290 for radiating the beams having passed through the third lens 260 onto a designated position on the scanning surface of a drum 270 or another scanning object. Even though a plurality of drums 270 exists, beams can be radiated onto the drums 270 using the rotatable reflective mirror 290.

In the embodiment of the present invention, the rotatable reflective mirror 290 can be replaced by a fixed reflective mirror (not shown) for reflecting the beams from the third lens 260, and a rotatable bar (not shown) for radiating the beams from the fixed reflective mirror onto a designated position on a scanning object. The rotatable bar has a shape almost similar to that of the rotatable reflective mirror, and a section thereof can have an arbitrary shape suitable for the reflecting operation of the rotatable bar, such as a rectangle, triangle or diamond.

Further, the scanning apparatus 200 of the present invention includes at least one slit 280 for selectively allowing only beams having required features among the beams diffracted by the light modulator 230 to pass therethrough, and transmitting the passed beams to the rotating mirror 240.

In this case, the LD 210, which is the light source, has a relatively low output, because the rotating mirror 240 simultaneously scans a plurality of beams, and so the scanning time of the LD required for exposure is allowed to be long with respect to a single pixel.

At least one first lens 220 is disposed between the LD 210 and the light modulator 230. If two or more first lenses 220 are employed, the first lenses 220 are arranged to be spaced apart from each other at regular intervals.

The light modulator 230 diffracts and modulates the laser beam, which is the collimated light incident from the first lens 220, to generate a plurality of diffracted beams, and scan the plurality of diffracted beams in a direction perpendicular to the scanning direction on a photosensitive surface. The light modulator 230 can simultaneously control a minimum of two pixels to a maximum of several hundred or thousand pixels within a range allowed by an optical system.

Further, the light modulator 230 can control pixels in an analog manner, so that it can perform gray control when it is applied to printers and display products. In this case, the light modulator 230 can control an optical lens and an optical projection distance, so that the size of a corresponding spot and an interval between spots can be controlled.

Hereinafter, the construction and the operation of the light modulator applied to the present invention are described in detail.

Figure 4A:
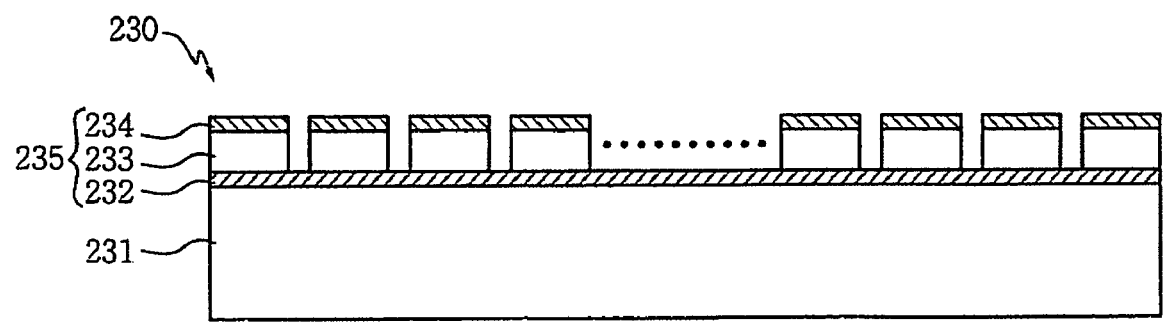
FIGS. 4a and 4b are sectional views showing the construction of a light modulator according to an embodiment of the present invention.

The light modulator 230 diffracts and modulates single beam-type linear light incident from the first lens 220 to generate a plurality of diffracted beams. As shown in FIG. 4a, the light modulator 230 includes a plurality of pixels 235 that are each comprised of a lower electrode layer 232, a piezoelectric/electrostrictive layer 233 and an upper electrode layer 234 formed on a base substrate 231, and are attached to the base substrate 231.

Figure 4B:
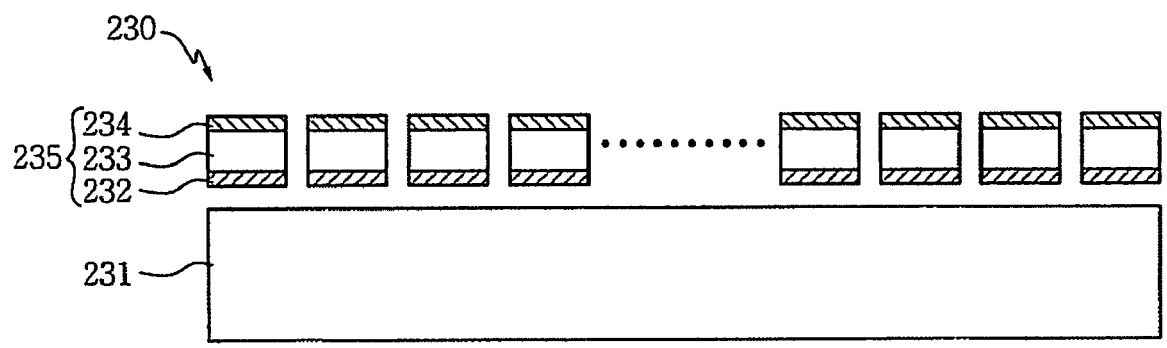

Further, as shown in FIG. 4b, the light modulator 230 includes a plurality of pixels 235 that are each comprised of a lower electrode layer 232, a piezoelectric/electrostrictive layer 233 and an upper electrode layer 234 formed on a base substrate 231, and are spaced apart from the base substrate 231.

In this case, the lower electrode layer 232 formed on the base substrate 231 functions to receive drive power from an external power source and provide the drive power to the piezoelectric/electrostrictive layer 233, and is formed through a sputtering or evaporation method using an electrode material, such as Pt, Ta/Pt, Ti/Pt, Ni, Au, Al, RuO2 or IrO$_2$.

The piezoelectric/electrostrictive layer 233 is disposed between the lower electrode layer 232 and the upper electrode layer 234, which will be described later, and contracted or expanded in response to the drive power applied through the lower and upper electrode layers 232 and 234 to be vertically or horizontally varied, thus varying each pixel 235. In detail, the piezoelectric/electrostrictive layer 233 is made of a piezoelectric material, such as PZT, PNN-PT, PLZT, ALN, ZnO, P$_b$, Zr or titanium.

In this case, the piezoelectric/electrostrictive layer 233 is formed on the lower electrode layer 232 in a thickness range of 0.01 to 20.0 μm by applying a wet-type method (screen printing, Sol-Gel coating, etc.) or a dry-type method (sputtering, evaporation, vapor deposition, Chemical Vapor Deposition (CVD), etc.) to the piezoelectric material.

The upper electrode layer 234 functions to provide externally applied drive power to the piezoelectric/electrostrictive layer 233 together with the lower electrode layer 232, and is formed on the piezoelectric/electrostrictive layer 233 by applying a sputtering or evaporation process to an electrode material, such as Pt, Ta/Pt, Ni, Au, Al or RuO2.

Figure 5A:
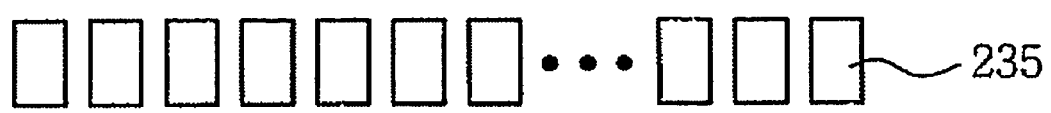
FIG. 5a is a view showing a one-dimensional array of actuating cells constituting the light modulator according to an embodiment of the present invention.

In this case, as shown in FIG. 5a, the light modulator 230 is comprised of a plurality of pixels 235 arranged in one dimension to scan a plurality of diffracted beams in one dimension in a direction perpendicular to a scanning direction on a photosensitive surface, thus simultaneously performing one-dimensional scanning.

Figure 5B:
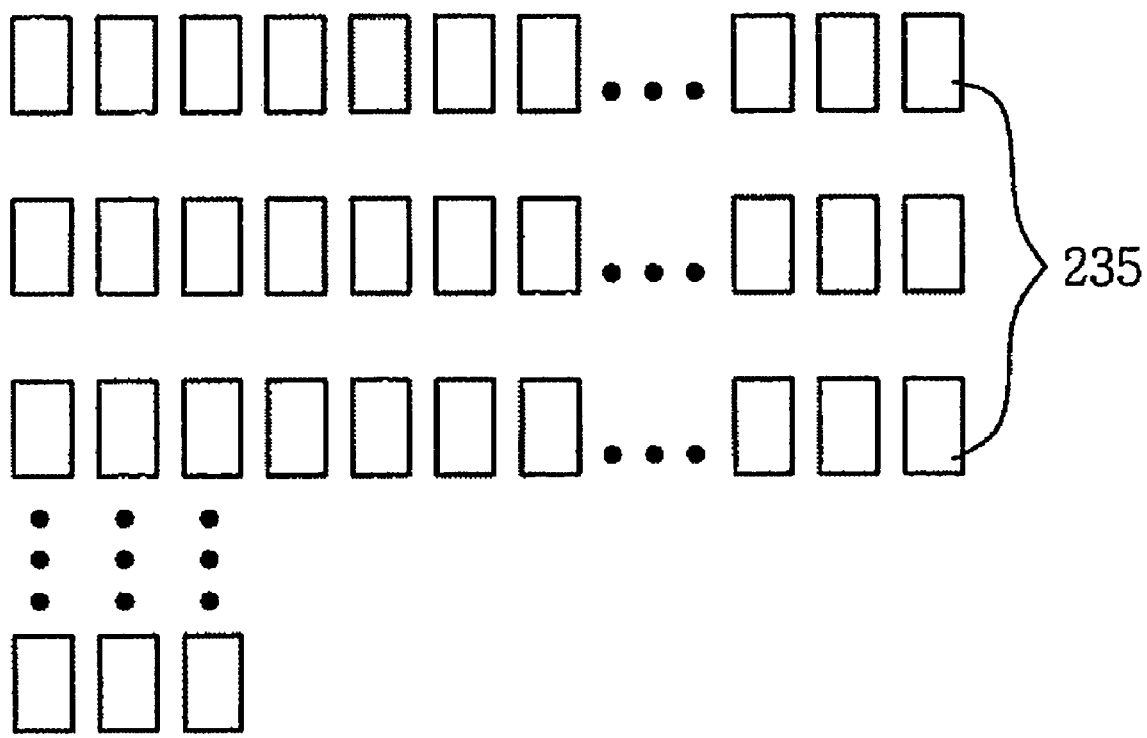
FIG. 5b is a view showing a two-dimensional array of actuating cells constituting the light modulator according to an embodiment of the present invention.

Further, as shown in FIG. 5b, the light modulator 230 is comprised of a plurality of pixels 235 arranged in two dimensions to scan a plurality of diffracted beams in two dimensions in a direction perpendicular to the scanning direction on the photosensitive surface, thus simultaneously performing two-dimensional scanning.

The rotating mirror 240 has a motor (not shown) that is rotatable in two directions, and radiates a plurality of diffracted beams while being rotated by the motor. Such a rotating mirror 240 may be implemented with a polygon mirror or a Galvano mirror.

If the polygon mirror is used as the rotating mirror 240, the polygon mirror is characterized in that it moves the plurality of diffracted beams output from the light modulator 230 at a constant linear velocity. At this time, the third lens 260 deflects a plurality of diffracted beams, reflected from the polygon mirror and moved at a constant angular velocity, in a main scanning direction.

If the Galvano mirror is used as the rotating mirror 240, the Galvano mirror is characterized in that it moves a plurality of diffracted beams, output from the light modulator 230, at a non-constant linear velocity. At this time, the third lens 260 deflects the plurality of diffracted beams, reflected from the Galvano mirror and moved at a non-constant angular velocity, in a main scanning direction.

At least one second lens 250 is interposed between the light modulator 230 and the rotating mirror 240. If two or more second lenses 250 are disposed, the second lenses 250 are arranged to be spaced apart from each other at regular intervals.

At least one third lens 260 can be implemented as an acceptor lens 260, but it is not limited to the acceptor lens 260.

At least one slit 280 is interposed between the light modulator 230 and the rotating mirror 240. If two or more slits 280 are disposed, the slits are arranged to be spaced apart from each other at regular intervals.

In the meantime, in the drawings, an example in which the scanning apparatus of the present invention is applied to the drum of a printer is shown, but the present invention is not limited to this example and can be applied to various photoelectric devices, such as display devices, including a projection TV, electronic photocopiers and word processors.

The operation of the scanning apparatus of the present invention having the above construction is described in detail.

When the laser diode 210 generates a laser beam, the first lens 220 converts the laser beam into collimated light, and focuses the collimated light onto the light modulator 230.

The light modulator 230 diffracts and modulates the laser beam that is converted into collimated light to output N beams. The second lens 250 focuses the plurality of diffracted beams in the direction of the rotation shaft of the rotating mirror 240.

In this case, if at least one slit 280 is arranged between the light modulator 230 and the rotating mirror 240, the slit 280 selectively allows diffracted beams having required features, among the beams diffracted by the light modulator 230, to pass therethrough and transmits the passed beams to the rotating mirror 240.

The plurality of focused and diffracted beams are scanned onto the drum 270 or a scanning object by the polygon mirror, moving at a constant linear velocity, or by the Galvano mirror, moving at a non-constant linear velocity.

At this time, since the rotation speed of the rotating mirror 240 can be decreased in proportion to the number of beams output from the light modulator 230, the present invention can use an inexpensive polygon mirror or Galvano mirror.

Accordingly, when the rotating mirror 240 is implemented with the polygon mirror, the third lens 260 deflects the plurality of diffracted beams, which are reflected from the polygon mirror and move at a constant angular velocity, in a main scanning direction, corrects aberration, and focuses and radiates the plurality of diffracted beams onto the scanning surface of the drum 270 or a scanning object.

If the rotating mirror 240 is implemented with the Galvano mirror, the third lens 260 deflects the plurality of diffracted beams, which are reflected from the Galvano mirror and move at a non-constant angular velocity, in a main scanning direction, corrects aberration, and focuses and radiates the plurality of diffracted beams onto the scanning surface of the drum 270 or a scanning object.

In the meantime, if the scanning apparatus of the present invention is applied to a printer, the printing speed of the printer is proportional to the multiplication of the rotation speed of the rotating mirror 240 by the number of beams, so that the printing speed can increase a minimum of several times to a maximum of several hundred times compared to the conventional scanning scheme.

Such a scanning process can be executed by the light modulator of the present invention, and an example of a scanning scheme of the present invention is described in detail.

First, at the time of performing initial scanning, scanning begins using only lower M beams, including first to M-th beams, among N beams. At this time, if skew equal to or greater than a vertical interval between beams occurs due to the rotation of the drum 270 or the movement of the surface of an equivalent scanning object, scanning is performed using lower M beams, including second to (M+1)-th beams, among all beams output from the light modulator 230. In this way, if scanning is continuously performed and skew equal to or greater than a vertical interval between beams occurs again, scanning is performed using M beams, including third to (M+2)-th beams, among all beams. By repeating this scanning process, skew occurring due to the movement of the surface of the drum 270 or equivalent scanning object is compensated for, so that the scanning is performed. When a beam reaches a right end portion of the scanning direction, scanning is performed using upper M beams, including (N−M)-th to N-th beams, among a total of N beams.

If such a series of scanning operations is terminated, and a beam reaches a left end portion at which scanning is to be started, the previous scanning procedure is repeated. At this time, in order to avoid the repeated scanning of beams and obtain a uniform output image, the amount of movement of the surface of a scanning object performed by one-pass forward scanning should be identical to (N−M) times an interval between beams, and the amount of movement of the surface of the scanning object performed during one scanning period should be M times the interval between beams. These N and M are related to the ratio of beam scanning regions of the polygon mirror 240, and both the rotation speed of the rotating mirror 240 and the movement speed of the surface of the scanning object are determined on the basis of N and M. On the contrary, N and M can be determined on the basis of the movement speed of the surface of the scanning object and the rotation speed of the rotating mirror 240. In the case of a drum-type printer, the value obtained by multiplying the rotation angular velocity of the drum by the radius of the drum corresponds to the movement speed of the surface of the scanning object.

Figure 6A:
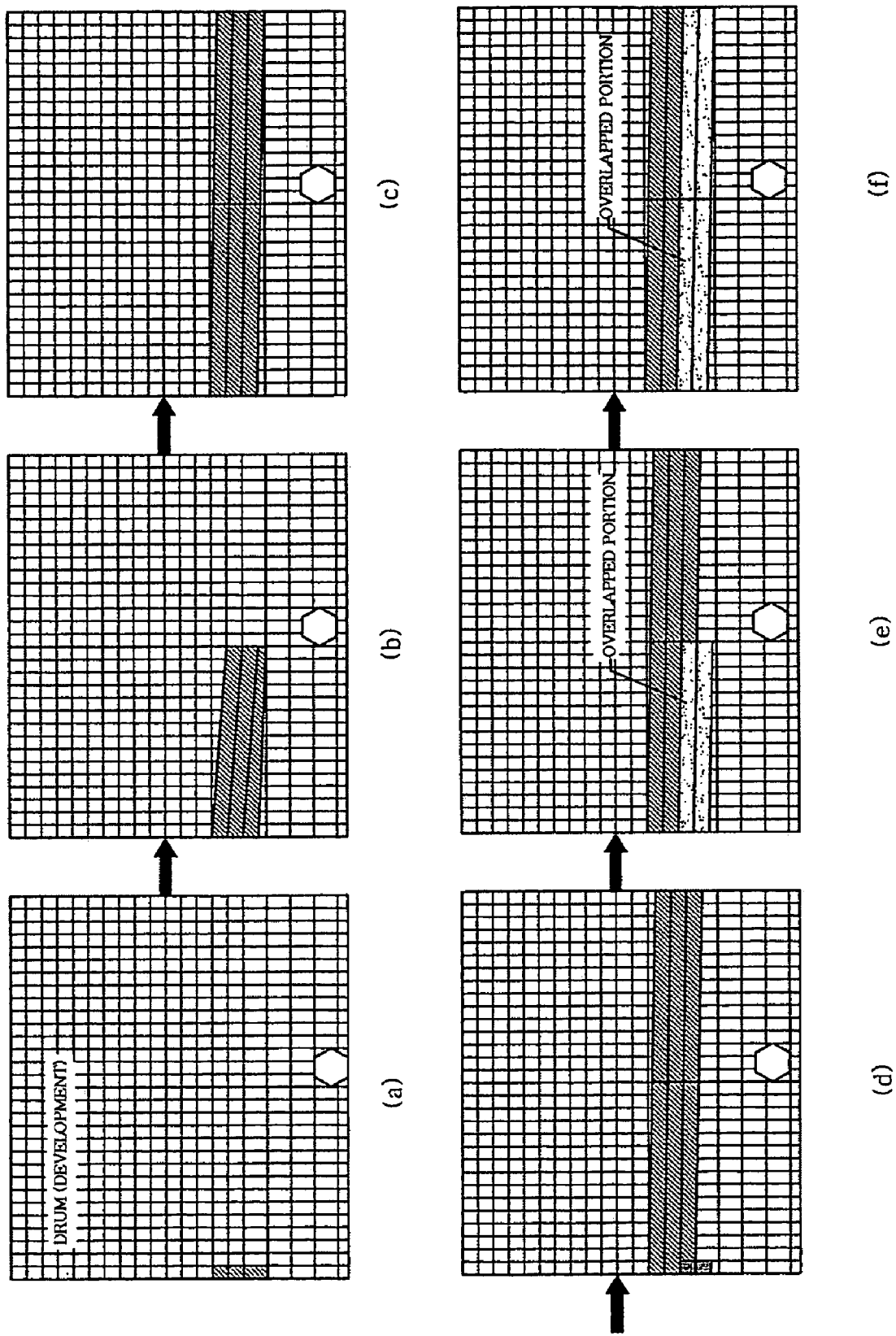
FIG. 6a is a view showing the characteristics of skew occurring during scanning using the scanning apparatus of the present invention.

When beams are scanned on the drum of a printer and printing is performed by the scanning apparatus using a plurality of diffracted beams according to the present invention, beams may overlap to cause skew, as shown in FIG. 6a.

FIG. 6a sequentially illustrates the characteristics of skew occurring at the time of scanning using the scanning apparatus of the present invention.

In order to perform printing by a printer, the drum 270 should rotate at a constant speed. Therefore, if the plurality of diffracted beams of the present invention are radiated while the rotating mirror 240 is rotated at a previous rotation speed, a phenomenon, in which beams scanned at one pass overlap with beams scanned the next pass, occurs, as shown in e to f of FIG. 6a.

Further, when three beams are simultaneously scanned, it can be seen that scanning regions overlap due to two continuous scanning operations, as shown in e to f of FIG. 6a.

In this way, the rotation speed of the rotating mirror 240 can just be decreased to prevent scanned beams from overlapping with each other with respect to each scanning pass. Even in this case, the movement speed of the surface of the scanning object must be uniform, so that an end point of one line scanning skews compared to a start point thereof with the movement of the scanning surface of the scanning object, which is defined as skew, which is the amount of an image skewed.

Further, in the case of a drum-type laser printer, a time required to scan one line is almost equal to a time required for the rotating mirror 240 to rotate by ⅙ of a revolution. The amount of rotation of the drum 270 for that time becomes the skew representing the amount of an image skewed.

In order to prevent the occurrence of skew, if the number of beams which can be simultaneously output from the light modulator 230 is increased and the beams, which are actually simultaneously output, are obtained using only part of the light modulator 230, bit shift can be performed vertically with the movement of beams. Through the bit shift, a scanning region on the drum 270 can follow movement progressing in a direction perpendicular to the scanning direction, thus minimizing the occurrence of skew.

Figure 6B:
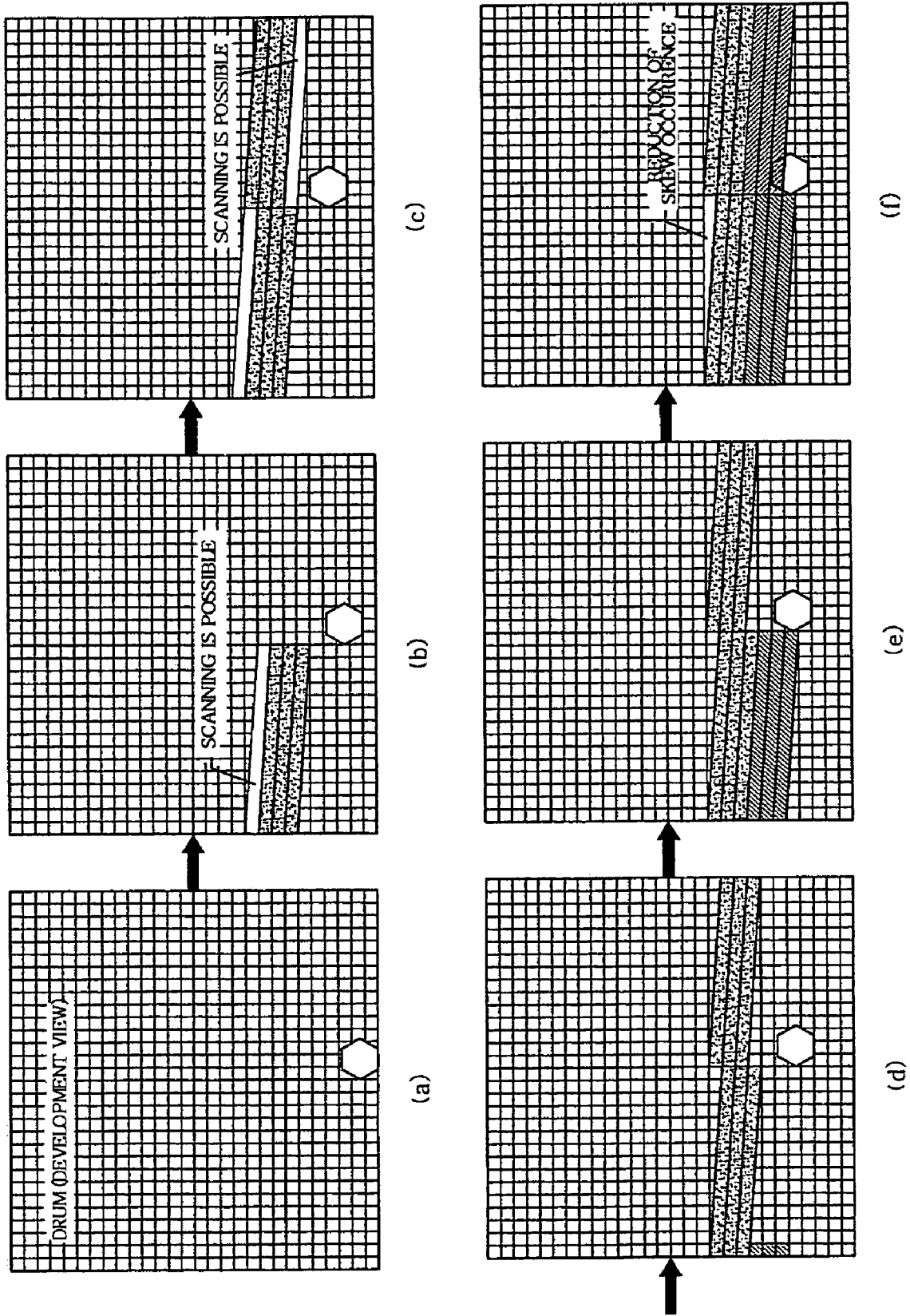
FIG. 6b is a view showing the characteristics of a process of minimizing the occurrence of skew when printing is performed by applying the scanning apparatus using a plurality of diffracted beams according to the present invention to a printer.

FIG. 6b sequentially illustrates the characteristics of a process of minimizing the occurrence of skew when the scanning apparatus using a plurality of diffracted beams according to the present invention is applied to a printer and printing is performed.

FIG. 6b shows the characteristics of a scanning process when the maximum number of beams is four, and only three beams are used for output. In this case, a reference point on the surface of the drum 270 moves upward with the rotation of the drum 270 in the development of the drum 270.

Initially, scanning begins using first to third beams. At this time, since one remaining beam exists, scanning is switched to use second to fourth beams when scanning progresses up to half of an entire scanning region. When the next scan begins, the scanning is repeated using the first to third beams.

If the scanning is performed through the above process, the amount of movement of the surface of the scanning object perpendicular to the scanning direction is two times the interval between beams during one-pass scanning. The amount of movement of the surface of the scanning object perpendicular to the scanning direction is one times the interval between beams during a time ranging from the termination of one-pass scanning to the start of the next scan. The sum of two movement values is the amount of movement of the surface of the scanning object performed during one scanning period, which becomes three, which is the number of beams actually output.

As described above, the present invention provides a scanning apparatus, which performs scanning using a light modulator for generating a plurality of diffracted beams to obtain the following advantages.

First, the present invention is advantageous in that it can decrease the rotation speed of a rotating mirror in proportion to the number of beams output from a light modulator, so that an inexpensive rotating mirror can be used, thus decreasing manufacturing cost.

Second, since the present invention is advantageous in that it simultaneously scans a plurality of beams, the scanning time of a laser diode required for exposure is allowed to be long with respect to a single pixel, so that a laser diode having relatively low output power is used, thus performing scanning at a lower voltage.

Third, the present invention is advantageous in that the printing speed of a printer is proportional to the multiplication of the rotation speed of a rotating mirror by the number of beams, so that printing speed can increase a minimum of several times to a maximum of several hundred times compared to a conventional scanning scheme.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A scanning apparatus using a plurality of diffracted beams, comprising:
    light generation processing means for generating a beam, converting the beam into collimated light, and outputting the collimated light;
    light modulation processing means for diffracting and modulating the beam, which is the collimated light output from the light generation processing means, and focusing a plurality of diffracted beams, the light modulation processing means comprising a light modulator with a lower electrode layer, a piezoelectric layer, and an upper electrode layer, the light modulator diffracting and modulating the beam to output a plurality of diffracted beams; and
    scanning means for moving and reflecting the plurality of diffracted beams focused by the light modulation processing means at a constant linear velocity or non-constant linear velocity, deflecting the plurality of diffracted beams, reflected and moved at a constant angular velocity or non-constant angular velocity, in a main scanning direction, correcting aberration, and focusing and scanning the plurality of diffracted beams onto a scanning surface of a scanning object,
    wherein the light modulator performs bit shift to prevent the occurrence of skew.

2. The scanning apparatus according to claim 1, wherein the light generation processing means comprises:
    a light source for generating a laser beam; and
    at least one lens for converting the laser beam, emitted from the light source, into collimated light.

3. The scanning apparatus according to claim 1, wherein the light modulation processing means further comprises
    at least one lens for focusing the plurality of diffracted beams output from the light modulator after being diffracted and modulated thereby, in a direction of a rotation shaft of the scanning means.

4. The scanning apparatus according to claim 3, further comprising at least one slit for selectively allowing beams having required features among the beams diffracted by the light modulator to pass therethrough, and transmitting the passed beams to the scanning means.

5. The scanning apparatus according to claim 1, wherein the scanning means comprises:
    a rotating mirror for moving and scanning the plurality of diffracted beams output from the light modulation processing means at a constant linear velocity or non-constant linear velocity; and
    at least one lens for deflecting the plurality of diffracted beams, reflected from the rotating mirror and moved at a constant angular velocity or non-constant angular velocity, in the main scanning direction, correcting aberration, and focusing and radiating the plurality of diffracted beams onto the scanning surface of the scanning object.

6. The scanning apparatus according to claim 5, wherein the rotating mirror moves and scans the plurality of diffracted beams, output from the light modulation processing means, at a constant linear velocity or non-constant linear velocity.

7. The scanning apparatus according to claim 5, wherein the lens deflects the plurality of diffracted beams, reflected from the rotating mirror and moved at a constant angular velocity or non-constant angular velocity, in the main scanning direction, corrects aberration, and focuses and radiates the plurality of diffracted beams onto the scanning surface of the scanning object.

8. The scanning apparatus according to claim 1, further comprising a rotatable reflective mirror interposed between the light modulation processing means and the scanning object so as to reflect the beams output from the light modulation processing means and radiates the reflected beams onto a designated position on the scanning object.

9. The scanning apparatus according to claim 1, further comprising a fixed reflective mirror disposed between the light modulation processing means and the scanning object to reflect the beams output from the light modulation processing means, and a rotatable bar for reflecting the beams output from the fixed reflective mirror and radiating the reflected beams onto a designated position on the scanning object.

10. A printer using a plurality of diffracted beams, comprising:
    light generation processing means for generating a beam, converting the beam into collimated light, and outputting the collimated light;
    light modulation processing means for diffracting and modulating the beam, which is the collimated light output from the light generation processing means, and focusing a plurality of diffracted beams, the light modulation processing means comprising a light modulator with a lower electrode layer, a piezoelectric layer, and an upper electrode layer, the light modulator diffracting and modulating the beam to output a plurality of diffracted beams; and
    scanning means for moving and reflecting the plurality of diffracted beams focused by the light modulation processing means at a constant linear velocity or non-constant linear velocity, deflecting the plurality of diffracted beams, reflected and moved at a constant angular velocity or non-constant angular velocity, in a main scanning direction, correcting aberration, and focusing and scanning the plurality of diffracted beams onto a scanning surface of a scanning object, wherein the light modulator performs bit shift to prevent the occurrence of skew.

11. The printer according to claim 10, wherein the light generation processing means comprises:
- a light source for generating a laser beam; and
- at least one lens for converting the laser beam, emitted from the light source, into collimated light.

12. The printer according to claim 10, wherein the light modulation processing means further comprises
- at least one lens for focusing the plurality of diffracted beams output from the light modulator after being diffracted and modulated thereby, in a direction of a rotation shaft of the scanning means.

13. The printer according to claim 10, wherein the scanning means comprises:
- a rotating mirror for moving and scanning the plurality of diffracted beams output from the light modulation processing means at a constant linear velocity or non-constant linear velocity; and
- at least one lens for deflecting the plurality of diffracted beams, reflected from the rotating mirror and moved at a constant angular velocity or non-constant angular velocity, in the main scanning direction, correcting aberration, and focusing and radiating the plurality of diffracted beams onto the scanning surface of the scanning object.

14. A display device using a plurality of diffracted beams, comprising:
- light generation processing means for generating a beam, converting the beam into collimated light, and outputting the collimated light;
- light modulation processing means for diffracting and modulating the beam, which is the collimated light output from the light generation processing means, and focusing a plurality of diffracted beams, the light modulation processing means comprising a light modulator with a lower electrode layer, a piezoelectric layer, and an upper electrode layer, the light modulator diffracting and modulating the beam to output a plurality of diffracted beams; and
- scanning means for moving and reflecting the plurality of diffracted beams focused by the light modulation processing means at a constant linear velocity or non-constant linear velocity, deflecting the plurality of diffracted beams, reflected and moved at a constant angular velocity or non-constant angular velocity, in a main scanning direction, correcting aberration, and focusing and scanning the plurality of diffracted beams onto a scanning surface of a scanning object, wherein the light modulator performs bit shift to prevent the occurrence of skew.

15. The display device according to claim 14, wherein the light generation processing means comprises:
- a light source for generating a laser beam; and
- at least one lens for converting the laser beam, emitted from the light source, into collimated light.

16. The display device according to claim 14, wherein the light modulation processing means further comprises
- at least one lens for focusing the plurality of diffracted beams output from the light modulator after being diffracted and modulated thereby, in a direction of a rotation shaft of the scanning means.

17. The display device according to claim 14, wherein the scanning means comprises:
- a rotating mirror for moving and scanning the plurality of diffracted beams output from the light modulation processing means at a constant linear velocity or non-constant linear velocity; and
- at least one lens for deflecting the plurality of diffracted beams, reflected from the rotating mirror and moved at a constant angular velocity or non-constant angular velocity, in the main scanning direction, correcting aberration, and focusing and radiating the plurality of diffracted beams onto the scanning surface of the scanning object.

* * * * *